United States Patent [19]

Koishi et al.

[11] Patent Number: 4,759,006
[45] Date of Patent: Jul. 19, 1988

[54] ABNORMAL TRACK SKIPPING DETECTION AND CONTROL ARRANGEMENT

[75] Inventors: Kenji Koishi, Hyogo; Tomio Yoshida, Katano; Isao Satoh, Neyagawa; Shunji Ohara, Higashiosaka; Yuzuru Kuroki, Moriguchi, all of Japan

[73] Assignee: Matsushita Electric Industrial Co., Ltd., Osaka, Japan

[21] Appl. No.: 42,520

[22] Filed: Apr. 27, 1987

Related U.S. Application Data

[63] Continuation of Ser. No. 594,827, Mar. 29, 1984, abandoned.

[51] Int. Cl.⁴ .............................................. G11B 7/09
[52] U.S. Cl. ........................................ 369/44; 369/46; 369/54; 369/111; 369/116; 358/907; 346/76 L
[58] Field of Search ............... 369/44, 46, 54, 58, 369/111, 106, 116, 124; 358/907; 360/10.1, 60; 346/76 L

[56] References Cited

U.S. PATENT DOCUMENTS 4,426,693  1/1984  Satoh ............................... 369/116
4,494,225  1/1985  Kimura ............................ 358/907
4,519,056  5/1985  Kimoto ............................. 369/54
4,554,652  11/1985 Maeda .............................. 369/54
4,570,251  2/1986  Yokota ............................. 369/54

Primary Examiner—Alan Faber
Attorney, Agent, or Firm—Wenderoth, Lind & Ponack

[57] ABSTRACT

A track skipping detection and control arrangement for an optical recording and reproducing disc formed with guide tracks for use in an optical information recording and reproducing apparatus. According to the track skipping detection and control arrangement of the present invention, any sudden track skipping which may take place during recording can be instantaneously detected by the track traversing signal so as to reduce the recording power for the prevention of erroneous recording to neighboring tracks. Moreover, by distinguishing the track traversing signal detected during the jumping operation for repeated continuous reproduction of the particular one track of the optical disc having spiral tracks, from the traversing signal due to the track skipping, erroneous recording may be similarly prevented also with respect to the optical disc having the tracks in the spiral configuration.

2 Claims, 7 Drawing Sheets

ABNORMAL TRACK SKIPPING DETECTION AND CONTROL ARRANGEMENT

This application is a continuation of now abandoned application Ser. No. 594,827 filed Mar. 29, 1984.

BACKGROUND OF THE INVENTION

The present invention generally relates to an optical information recording and reproducing and more particularly, to a track skipping detection and control arrangement for an optical recording and reproducing disc formed with guide tracks for use in an optical information recording and reproducing apparatus.

For the optical information recording and reproducing apparatus as referred to above, there has conventionally been proposed, for example, an arrangement in which, with an optical disc painted or deposited with a photosensitive material being kept rotating, a light beam such as a laser beam or the like, which is converged into a very small diameter spot of less than 1 micrometer, is irradiated onto the optical disc, and by modulating the output intensity of light through recording signals, information such as video signals and digital signals may be recorded on the optical disc in real time as phase variations by concave-convex portions or optical characteristic variations such as variations in refractive index, light reflectance or transmittance, etc., while the information thus recorded may be reproduced by detecting the optical characteristic variations as referred to above.

Based on the arrangement as described above, there may be considered an optical information recording and reproducing apparatus in which guide tracks for guiding tracks to be recorded are preliminarily provided in the form of a concentric circle or in a spiral configuration due to requirements for a higher density, partial writing-in or erasing in a dispersed manner, information is recorded on the predetermined track by applying tracking control so as to follow said guide track, or such information is reproduced from said track.

The guide tracks formed in the optical disc should properly be, for example, in the concave-convex groove-like structure. The information is recorded on a recording medium such as an amorphous metal deposited on the optical disc provided with the guide tracks, and is accumulated in the form of hole formation by the evaporation of the recording medium or local blackening thereof.

The identification of the guide tracks is effected through deviation of light intensity distribution at opposite sides in a direction of the guide track by a far visual field pattern of a laser beam as reflected by the guide track. The deviation as referred to above is subjected to a photo-electric conversion by a photo-detector having two light receiving portions arranged to be parallel to the tangential direction of said guide track so as to be applied to a tracking control means.

For the optical disc having the guide tracks as referred to above, there may be conceived a structure as in FIG. 1, which shows a fragmentary perspective view of an optical recording and reproducing disc 1 to which the present invention may be applied. The optical recording and reproducing disc 1 includes a substrate B, grooves each having a width W, a depth D and a pitch P and formed on one surface R of the substrate B to constitute thereon guide tracks 10a, 10b, 10c, 10d and 10e in a concentric or spiral configuration which are separated from each other by flat portions 11a, 11b, 11c, 11d and 11e provided therebetween, and a layer of photosensitive recording material deposited on the surface R to form a recording layer 12 thereon. A very fine beam of light forming a spot is irradiated onto the disc 1, for example, from the side of the substrate B so as to be focused on the surface R for recording necessary information thereon. For recording and reproduction, the tracking control is applied so that the beam of light forming a spot is provided on the groove-like guide tracks 10a–10e. During the recording, light energy of the beam of light projected onto the groove-like guide tracks 10 is increased by increasing the light output of a light source (not particularly shown) for sensitization of the recording material applied onto the guide tracks 10a–10e, with a result that the light reflectance of the recorded portion on the groove-like guide tracks 10a–10e is varied, and if the above variation of the reflectance is detected through the employment of a beam of light spot with a light output smaller than that used in the recording, the recorded signal may be reproduced. The state where the recording material on the guide tracks 10a–10e is sensitized during the recording is shown at 13, whereat the recording material is blackened, with an increase of the light reflectance. For specific values of the width W, pitch P and depth D of each of the guide tracks 10a to 10e, there may be selected, for example, 0.6 micrometer for the width W, 1.6 micrometer for the pitch P, and 100 λ for the depth D, (the light path length being $\frac{1}{8}$ of the wavelength of the laser light source referred to earlier).

Referring to FIG. 2, there is shown a diagram illustrating an optical disc 1 and a scanning locus of the light beam upon occurrence of the track skipping.

As shown in FIG. 2, the optical disc 1 has address signals preliminarily cut in track address areas 2A and 2B by concave and convex portions of the grooves so as to be used for retrieval and identification of the required tracks. Normally, the track address area as referred to above is provided in one or two positions per one track. In other words, in the case where one track is subjected to reproduction through one rotation, the present track addresses may be checked only two times per rotation.

As an order for recording information on the optical disc 1, for example, as shown in FIG. 2, the present track 3 is retrieved, and after reproduction of the track address 2A, the recording mode is started at a recording starting point 7. More specifically, from the point 7, the laser light source is set to a power required for the sensitization of the recording medium, and the light beam is modulated according to the information recording signal. During the track recording, it is possible that the tracking servo deviates from the present track 3, and causes a track skipping while traversing or crossing other tracks, although this may not take place so frequently. As possible causes of the above inconvenience, there may be considered deformation of the grooves on the disc 1, flaws on the surface thereof, or unstability of the tracking servo at the starting of the recording when the recording is made by dividing into sectors. Moreover, such track skipping also takes place when external vibrations, impacts, etc. are applied to an optical head (not particularly shown).

Even when the track skipping has occurred during recording as described above, it can not be detected until the address signal 2B is reproduced as described earlier. In other words, the track skipping is not detected for a section 6, and the information is undesirably recorded on a track 5 after the skipping, with a misidentification thereof as the present track 3. What is more disadvantageous is that, if a track skipping as shown at 8 takes place, the recording is effected by crossing the tracks 4, and if information has been already recorded on the tracks 4, the so-called double writing-in is effected, thus resulting in a spoiling of the information in the tracks 4. Upon consideration of a case where the skipping traverses still more tracks, all the information of the tracks thus traversed are subjected to the double writing-in, with a consequent loss of the information. Furthermore, any tracks 4 thus traversed, even the tracks 4 which are not recorded with information as yet, become incapable of recording.

Since the damage due to the track skipping is very large as described so far, it is necessary to immediately stop the recording mode when the track skipping takes place during the recording.

SUMMARY OF THE INVENTION

Accordingly, an essential object of the present invention is to provide a track skipping detection and control arrangement for an optical disc having guide tracks for use in an optical information recording and reproducing apparatus, which is capable of preventing damage to information on recorded tracks due to writing into erroneous tracks during recording or due to recording while traversing the tracks.

Another important object of the present invention is to provide a track skipping detection and control arrangement of the above described type which is simple in structure and stable in functioning, and can be readily incorporated into various optical information recording and reproducing apparatus at a low cost.

According to the present invention, it is so arranged that the track skipping is detected at a moment when a light beam jumps out of a recording track through utilization of a track traversing signal without reproducing address signals so as to reduce a recording power immediately for preventing erroneous recording, double recording, etc., and the arrangement of the present invention is extremely useful to improve the reliability of data on the optical disc.

More specifically, in accomplishing these and other objects, according to one preferred embodiment of the present invention, there is provided a track skipping detection and control arrangement, which includes: a means for irradiating light, such as a laser beam, which is converged into a spot of light of a very small diameter, onto an optical disc provided with groove-like guide tracks in a concentric or spiral configuration; a means for subjecting the spot of light of very small diameter to a tracking control with respect to the guide tracks; a means for recording and reproducing information by recording light, and reproducing light from the light irradiating means; means for detecting that the spot of light of very small diameter has unnecessarily caused a track skipping from the guide track effecting recording of information, with the light irradiating means used for the recording light, to another guide track, and a means for varying a light power output of the light irradiating means from a recording state power to a non-recording state power instantaneously upon a detection of the track skipping.

By the construction according to the present invention as described above, an improved track skipping detection and control arrangement has been advantageously provided through a simple construction, with a substantial elimination of disadvantages inherent in the conventional arrangements of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
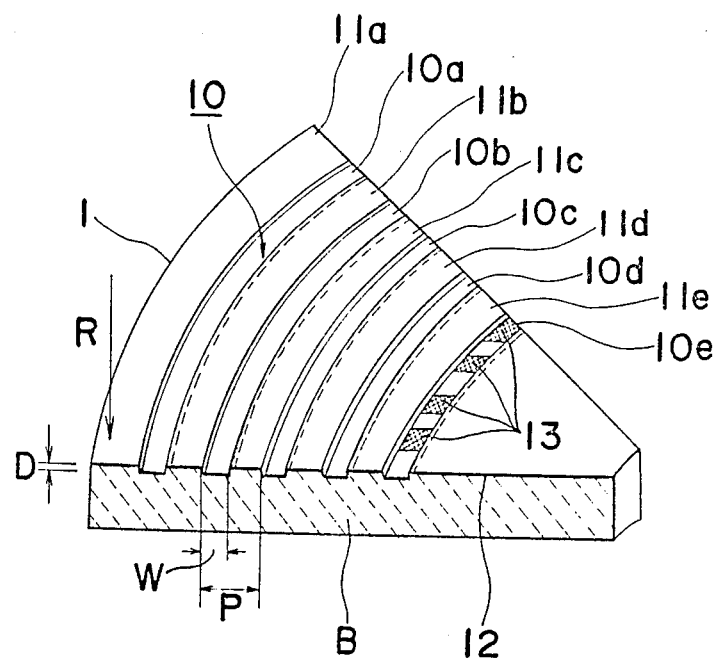
FIG. 1 is a fragmentary perspective view of an optical recording and reproducing disc to which the present invention may be applied, showing the structure of guide tracks formed in a groove-like configuration (already referred to)

Before the description of the present invention proceeds, it is to be noted that like parts are designated by like reference numerals throughout the accompanying drawings.

Figure 3:
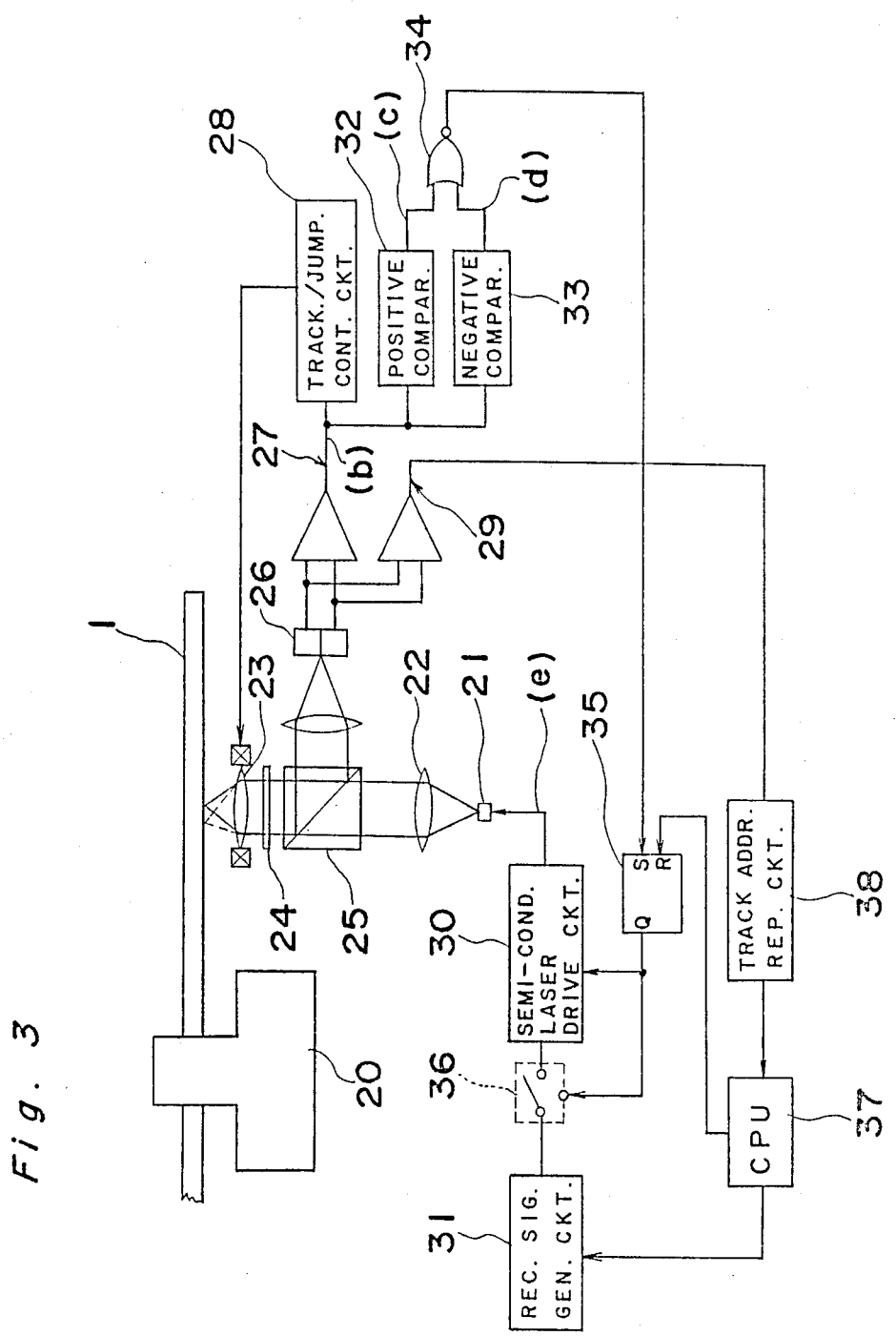
FIG. 3 is a block diagram showing the general construction of an optical information recording and reproducing apparatus provided with a track skipping detection and control arrangement according to one preferred embodiment of the present invention.

Referring now to the drawings, there is shown in FIG. 3 an optical information recording and reproducing apparatus provided with a track skipping detection and control arrangement according to one preferred embodiment of the present invention.

In FIG. 3, the optical information recording and reproducing disc 1 (referred to as an optical disc hereinbelow) is arranged to be rotated by a disc motor 20. Light emitted from a light source 21, for example, a semi-conductor laser or the like, is collected by a condenser lens 22, and converged by a converging lens 23 into a light spot of about 1 micrometer in diameter on the optical disc 1. Light reflected from the optical disc 1 is separated by a λ/4 plate 24 and a polarized light beam splitter 25 disposed between the condenser lens 22 and the converging lens 23 so as to be directed to a two divisional photo-detector 26, which is so disposed that its dividing boundary line is in a parallel relationship with respect to the tracks on the optical disc 1.

The photo-detector 26 is connected through an amplifier to a tracking and jumping control circuit 28 and also coupled to a positive comparator 32 and a negative comparator 33 which are connected to a flip-flop 35 through an OR gate 34. The photo-detector 26 is also coupled through another amplifier to a track address reproducing circuit 38 which is further connected to a recording signal generating circuit 31 through a CPU (central processing unit) 37 coupled to the flip-flop 35. The flip-flop 35 is further connected to a semi-conductor laser drive circuit 30 and an analog gate 36 inserted between the recording signal generating circuit 31 and the semi-conductor laser drive circuit 30.

A tracking error signal 27 of the photo-detector 26 produced through the amplifier is used to drive the converging lens 23 in a direction at right angles with the tracks via the tracking and jumping control circuit 28 for applying the tracking control, while a reproduction output signal 29 of the photo-detector 26 produced through another amplifier is fed to the track address reproduction circuit 38 for reproduction of the recording signal and track address.

The light source 21 of the semi-conductor laser and the like is connected to the semi-conductor laser drive circuit 30 so as to be set thereby to the reproduction power or recording power. The recording signal generating circuit 31 produces recording signals such as digital signals or video signals, etc. so as to modulate the power of the semi-conductor laser during the recording.

Figure 2:
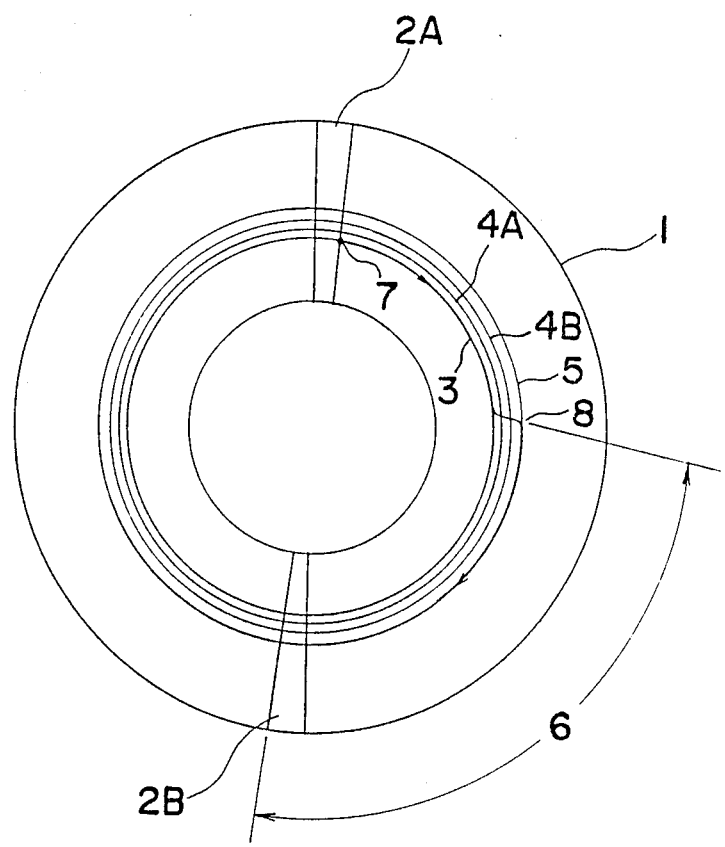
FIG. 2 is a diagram showing an optical recording and reproducing disc and a locus of light beam when a track skipping has taken place (already referred to)
Figure 4:
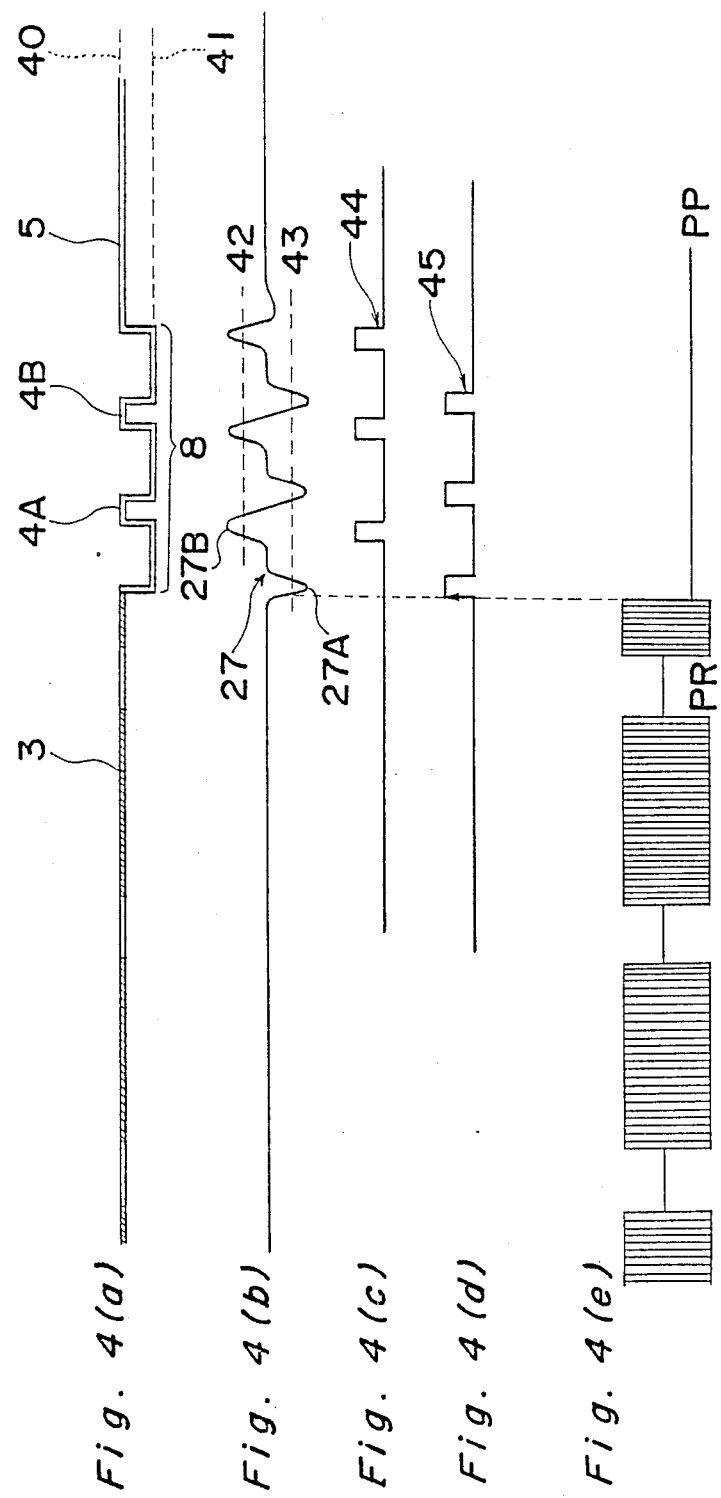
FIGS. 4(a) through 4(e) are diagrams illustrating signal waveforms at various parts when the track skipping takes place.

Referring also to FIGS. 4(a) through 4(e) illustrating signal waveforms at various parts when the track skipping has taken place, symbols (b) to (e) in FIG. 3 represent observation points of the signal waveforms in FIGS. 4(b) to 4(e) respectively. FIG. 4(a) denotes the track cross section in the scanning direction of the light beam as viewed from the light beam. In FIG. 4(a), the groove tracks 40 and flat portion 41 between the grooves are shown for the respective levels, with the respective tracks corresponding to those in FIG. 2. The numeral 3 denotes the track being recorded at present, with the blackened portion showing the state of sensitization. FIG. 4(a) also shows that, upon occurrence of the track skipping as at 8, the light spot crosses the tracks 4A and 4B, with the tracking servo being applied to the track 5 to which the light spot is directed. Meanwhile, FIG. 4(b) represents the output waveform of the tracking error signal 27 (FIG. 3), which serves as a traversing signal. Thus, when the light spot deviates from the groove track 40, the tracking error signal is output in a negative direction as at 27A, while when the light spot enters the groove track 40 from the flat portion 41 between the grooves, it is produced in a positive direction as at 27B. Although the above description relates to the case where the light beam crosses from the inner side to the outer side of the optical disc 1, the positive and negative directions of the error signal are reversed, when the light beam crosses from the outer side towards the inner side of the optical disc 1. In the case where the tracking servo is applied to the groove track 40, the level of the error signal naturally falls to the vicinity of zero as shown in FIG. 4(b). As described above, if the moment at which the tracking is deviated from the track 3 being recorded at present, i.e. falling of the waveform at 27A, is detected, the track skipping 8 can be detected without causing other tracks to be scanned by the recording beam. When the waveform of the error signal 27 in FIG. 4(b) is output in a threshold value at 42 by the positive comparator 32 (FIG. 3), and in a threshold value at 43 by the negative comparator 33 (FIG. 3), track skipping detecting signals 44 and 45 as in FIGS. 4(c) and 4(d) can be obtained. Since the rising or positive edge of the first pulse in FIG. 4(c) or 4(d) is at the timing at which the track skipping 8 takes place, with the light beam not entering the flat portion 41 between the grooves at yet, if the power of the semi-conductor laser is reduced to the reproducing light power at the timing of the above rising, erroneous recording at the flat portions between the grooves may be prevented. In the case where the pulses in FIG. 4(d) are produced before the pulses in FIG. 4(c), it is indicated that the track skipping has taken place towards the inner side of the optical disc 1, while on the contrary, when the pulses in FIG. 4(c) are produced before the pulses in FIG. 4(d), it is detected that the track skipping has occurred towards the outer side of the optical disc 1.

In the arrangement of FIG. 3, the track skipping pulse signals of FIGS. 4(c) and 4(d) are processed for logical sum at the OR gate 34 connected between the positive and negative comparators 32 and 33 and the flip-flop 35, and thus, the flip-flop 35 is set by the output of the OR gate 34 to open the analog gate 36 for cutting off the connection between the recording signal generating circuit 31 and the semi-conductor laser drive circuit 30 and also for reducing the light power of the semi-conductor laser drive circuit 30 from the recording power to the reproducing power. FIG. 4(e) represents the light output waveform of the semi-conductor laser, in which during recording, the recording signal is modulated by a bias power at PR, and the modulation is suspended at the rising or positive edge of the first pulse in FIG. 4(d) for reduction to the reproducing power. The CPU 37 (central processing unit) connected between the circuits 31 and 38, and also, coupled to the flip-flop 35 in FIG. 3, ensures the address of the track to which the skipping is effected by the input from the track address reproducing circuit 38, and resets the flip-flop 35 so as to wait for a subsequent track skipping detection.

Figure 5:
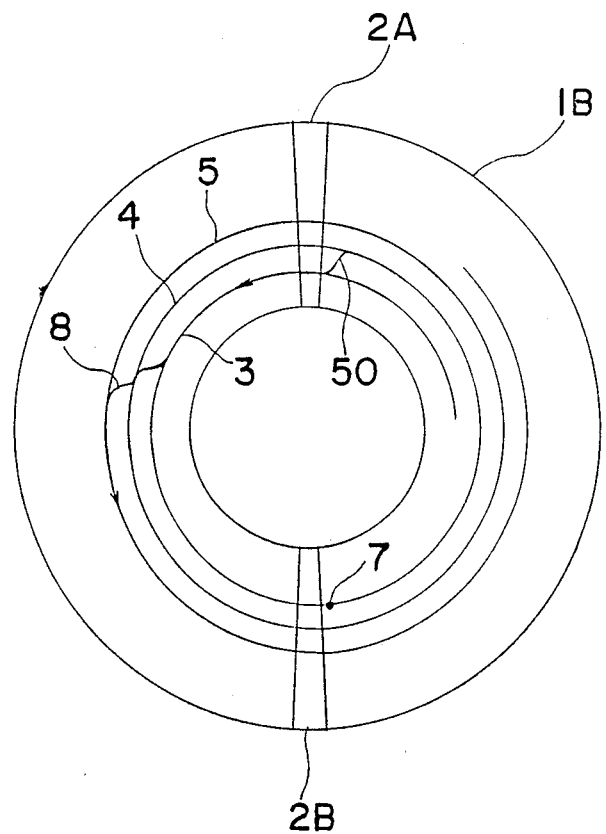
FIG. 5 is a diagram explanatory of an occurrence of a track skipping during recording on the optical disc having guide tracks in a spiral configuration.

Referring further to FIG. 5, there is shown a diagram for explaining the occurrence of the track skipping 8 during recording onto the optical disc 1B having turns of guide tracks in a spiral configuration. For a higher density of an optical disc, it is necessary to narrow intervals between the tracks, and with respect to the guide tracks having such narrow track pitch as above, there are cases where the guide tracks are cut into the spiral shape for reduction of pitch feeding irregularities. In the case where data are recorded in the spiral guide tracks as described above, it is required to effect recording, while applying the tracking control to the guide track at a particular address. In other words, there is required a jumping operation which effects skipping and jumping over one track for each one rotation of the optical disc 1B so as to move the light beam up to a starting position of the particular guide track. In FIG. 5, there is provided the jumping section 50 to be effected per each rotation of the optical disc 1B. Even during recording of data in the spiral guide tracks as described above, there is a case where an unnecessary track skipping takes place as shown at 8 in FIG. 5 as described earlier, which crosses the tracks 4 from the present track 3 for skipping over to the track 5 in the same manner as in FIG. 2.

In FIGS. 6(a) to 6(e), there are shown signal waveforms at various parts upon occurrence of track skipping in the similar manner as in FIGS. 4(a) to 4(e) described earlier, with FIGS. 6(a) to 6(e) representing waveforms at the same portions as those in FIGS. 4(a) to 4(e).

Figure 6:
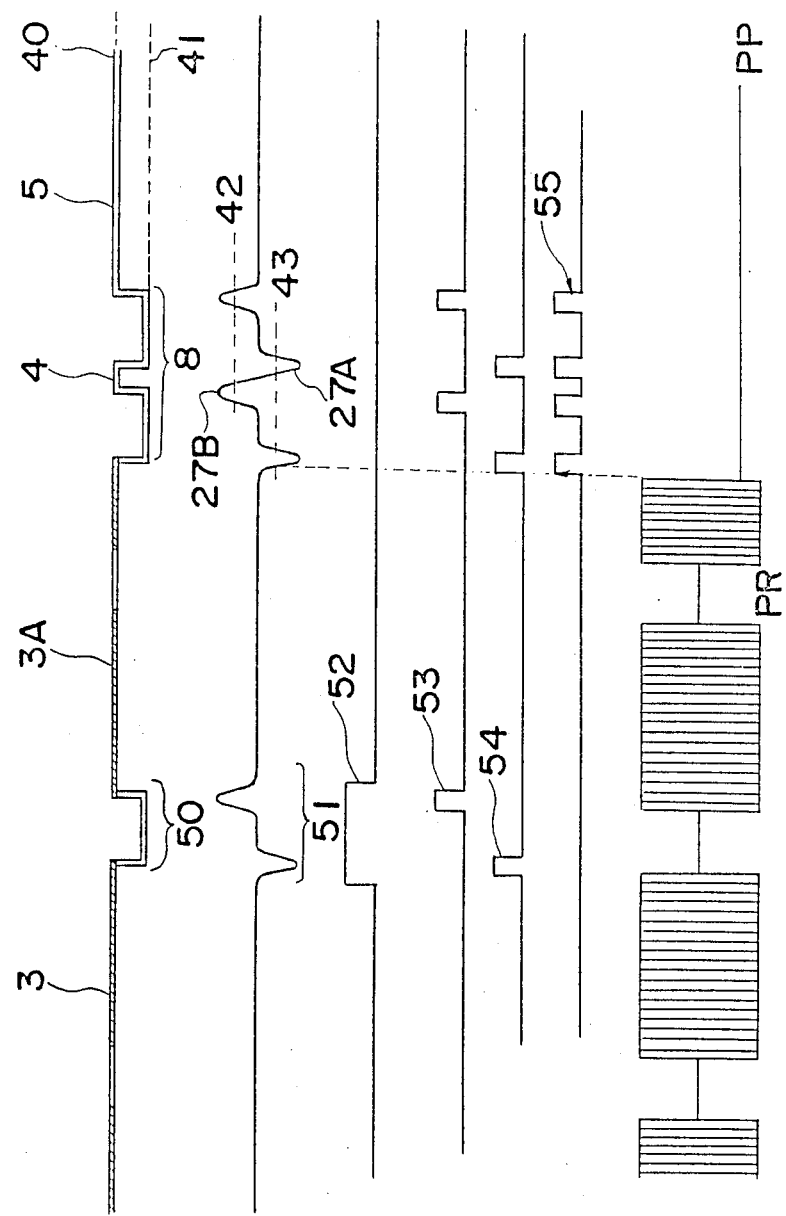
FIGS. 6(a) through 6(g) are diagrams illustrating signal waveforms at various parts when the track skipping takes place.
Figure 7:
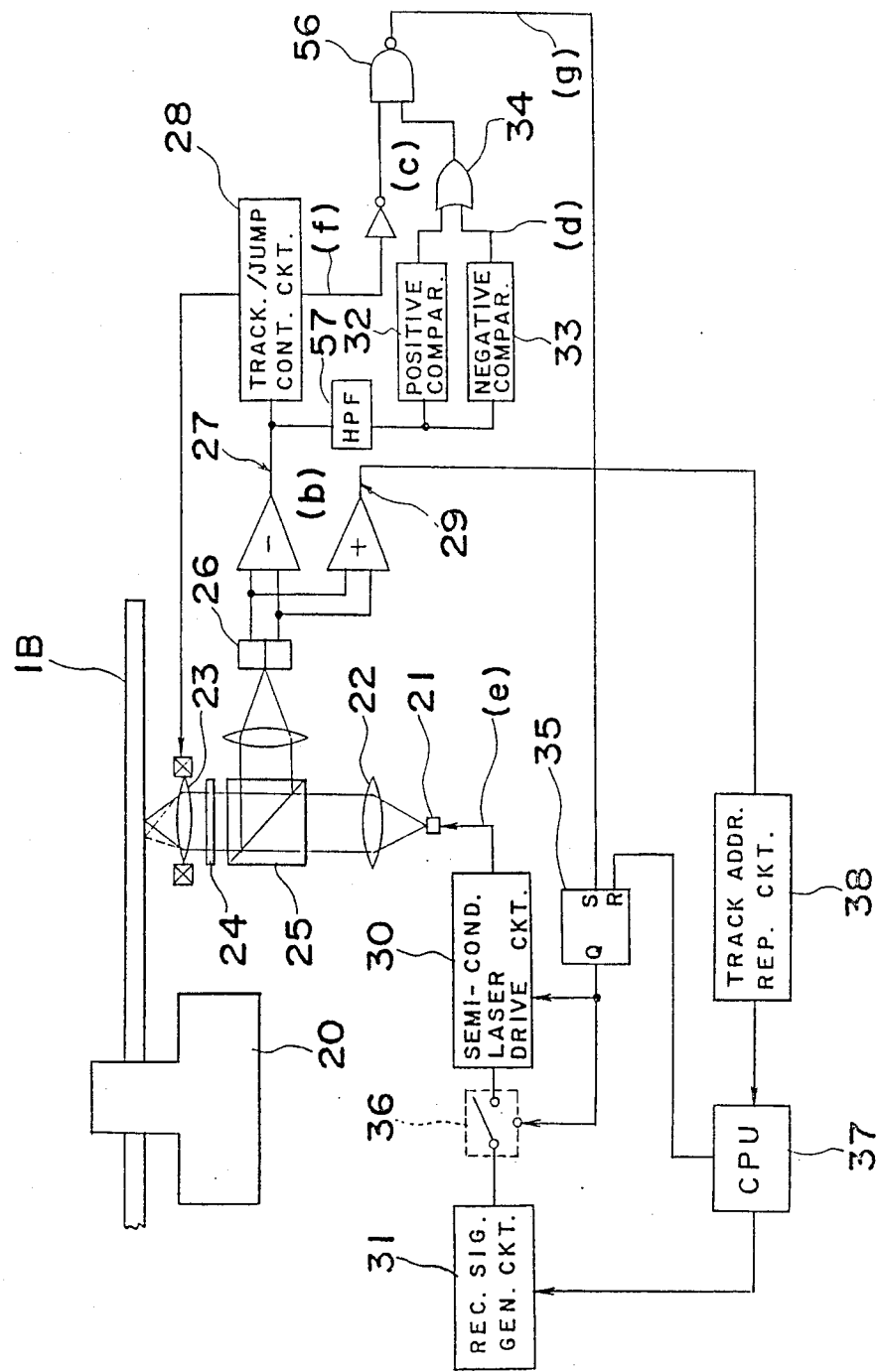
FIG. 7 is a block diagram similar to FIG. 3, which particularly shows a modification thereof for an optical disc provided with guide tracks in a spiral configuration.

Referring also to FIG. 7 showing a block diagram of an optical information recording and reproducing apparatus provided with a track skipping detection and control arrangement for the optical disc having guide tracks in the spiral configuration according to a modification of the present invention, symbols (b) to (g) represent observation points of the signal waveforms given in FIGS. 6(b) to 6(g) respectively.

As compared with the arrangement of FIG. 3, the modification of FIG. 7 further includes an AND gate 56 connected, at its input side, between the tracking and jumping control circuit 28 and the OR gate 34, and, at its output side, to the flip-flop 35, and a high-pass filter 57 inserted between the junction of one amplifier of the photo-detector 26 and the tracking and jumping control circuit 28 and the positive and negative comparators 32 and 33 as shown, while other constructions are generally similar to those in FIG. 3, with like parts being designated by like reference numerals. As described previously, the numeral 50 in FIG. 6(a) which shows the track cross section in the scanning direction of the light beam, denotes the jumping section for continuously applying the tracking control to the particular track. When the jumping operation is effected in the manner as described above, the light spot crosses the portion between the grooves from the groove portions of the guide tracks, and therefore, a traversing signal 51 is detected in the tracking error signal of FIG. 6(b) in the similar manner as in the case where the track skipping has taken place. Thus, it is necessary not to judge this traversing signal 51 as a track skipping. FIG. 6(f) shows a jumping section pulse 52 composed of the driving pulses for the jumping. When the above jumping section pulse 52 and the outputs of the positive and negative comparators 32 and 33 (FIGS. 6(c) and 6(d)) are processed for logical product through employment of the AND gate 56, it may be so arranged that the jumping pulses 53 and 54 in the jumping section formed by the traversing signal 51 are not judged as the track skipping signals. Accordingly, through employment of the rising edge or positive edge of the first pulse of the track skipping detection signal 55 as shown in FIG. 6(g), it becomes possible to correctly grasp only the track skipping, and to reduce the light power from the recording state to the reproducing power. In the arrangement of FIG. 7, the high-pass filter 57 provided between the output of the photo-detector 26 and the comparators 32 and 33 is intended to eliminate the error voltage having the period of one rotation of the optical disc during the tracking control for causing the comparators 32 and 33 to positively effect the functions thereof.

As described so far, in the arrangement of FIG. 7, it is possible to accurately detect the track skipping regardless of the jumping operation, even in the case where intermittent recording for a particular track of an optical disc having spiral guide tracks is to be continued.

As is clear from the foregoing description, according to the track skipping detection and control arrangement of the present invention, any sudden track skipping which may take place during recording can be instantaneously detected by the track traversing signal so as to reduce the recording power for the prevention of erroneous recording. Moreover, by distinguishing the track traversing signal detected during the jumping operation for repeated continuous reproduction of the particular one track of the optical disc having spiral tracks, from the traversing signal due to the track skipping, erroneous recording may be similarly prevented also with respect to the optical disc having the tracks in the spiral configuration.

Without the track skipping detection and control arrangement according to the present invention, the track skipping can not be detected until the track address is reproduced after the track skipping has taken place, and therefore, by traversing the tracks due to the track skipping taking place during recording, important information on the tracks already recorded is damaged, while, owing to the undesirable recording on the track to which the skipping is effected, the information on the optical disc is heavily damaged on the whole.

On the contrary, according to the present invention, it is possible to detect the timing at the moment when the light beam causes the track skipping from the track being recorded, through utilization of the characteristic of the tracking traversing signal for instantaneous reduction of the recording light power to the reproducing power. Thus, according to the present invention, erroneous recording, double recording, etc. resulting from sudden track skippings can be perfectly prevented, with a worked improvement of reliability of recorded data on the optical disc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An abnormal track skipping detection and control arrangement which comprises: a means for irradiating a light beam, which has been converged into a spot of light of a very small diameter, onto an optical disc provided with undulation free groove-like guide tracks in a concentric or spiral configuration; a means for subjecting said spot of light to a tracking control with respect to said guide tracks; a means for recording and reproducing information by recording light and reproducing light from said light irradiating means; a means for detecting during recording that said spot of light has unnecessarily caused a track skipping from the guide track effecting recording of information to another guide track, and a means for varying a light power output of said light irradiating means from a recording state power to a non-recording state power instantaneously upon a detection of said track skipping; said detecting means including a two divisional photo-detector having a dividing boundary line thereof disposed in a direction parallel to a tangential direction of said guide tracks so as to receive a reflected light or a transmitted light from said spot of light, said photo-detector having a means for detecting abnormal track skipping by detecting a difference signal produced by said photo-detector when said spot of light traverses said guide tracks; further including a means for controlling said light power output of said light irradiating means from said non-recording state power into another reproducing state power; further including a means for differentiating between a first track traversing signal detected during a jumping operation period for continuously reproducing one specific track in said guide tracks when said tracks are in a spiral configuration, from a second other track traversing signal detected when abnormal track skipping has taken place, using jumping section pulses generated by said tracking control means during said abnormal jumping operation.

2. In an optical recording and reproducing apparatus arranged to irradiate light from a laser light source as converged into a spot of light, onto an optical disc provided with guide tracks for recording and reproduction of information, an abnormal track skipping detection and control arrangement which comprises a two divisional photo-detector having a dividing boundary line thereof disposed in a direction parallel to a tangential direction of the guide tracks so as to receive the light reflected from the optical disc and adapted to detect, from a difference signal of an output of said two divisional photo-detector, that an abnormal track skipping has unnecessarily taken place from a guide track effecting the recording of information to another guide track not required for recording of information, and means for varying light power of said laser light source from a recording state to a reproducing state; wherein said guide tracks are in a spiral configuration, and said detecting and control arrangement includes means disposed such that during a normal track jumping operation period for starting the track skipping per each rotation of the optical disc, in order to cause the guide track of the same circumference to continuously effect the tracking function, the normal track traversing signal detected from the difference signal of said output of said two divisional photo-detector and an abnormal track skipping detection signal for detecting that the abnormal track skipping has unnecessarily taken place to the guide track not required for the recording, are differentiated from each other using a track jump starting pulse which is produced during the track jumping operation period.

* * * * *